(12) United States Patent
Renn

(10) Patent No.: US 12,311,719 B2
(45) Date of Patent: May 27, 2025

(54) HYDRAULIC FLUID SUPPLY SYSTEM, IN PARTICULAR FOR A SUSPENSION SYSTEM

(71) Applicant: ZF FRIEDRICHSHAFEN AG, Friedrichshafen (DE)

(72) Inventor: Josef Renn, Dettlebach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 297 days.

(21) Appl. No.: 17/780,710

(22) PCT Filed: Nov. 25, 2020

(86) PCT No.: PCT/EP2020/083286
§ 371 (c)(1),
(2) Date: May 27, 2022

(87) PCT Pub. No.: WO2021/110499
PCT Pub. Date: Jun. 10, 2021

(65) Prior Publication Data
US 2023/0356557 A1  Nov. 9, 2023

(30) Foreign Application Priority Data

Dec. 2, 2019 (DE) .......... 10 2019 218 699

(51) Int. Cl.
*F16F 9/56* (2006.01)
*B60G 17/056* (2006.01)

(52) U.S. Cl.
CPC .............. *B60G 17/056* (2013.01); *F16F 9/56* (2013.01); *B60G 2500/30* (2013.01)

(58) Field of Classification Search
CPC ...... B60G 17/056; B60G 2500/30; F16F 9/56
USPC ..... 188/314, 315, 317, 318, 322.19, 322.21; 267/34, 64.16, 64.17; 280/5.507, 5.514, 280/5.515, 124.158–124.161
See application file for complete search history.

(56) References Cited

U.S. PATENT DOCUMENTS

| | | | | |
|---|---|---|---|---|
| 3,797,140 | A * | 3/1974 | McWilliams | B62D 53/021 137/625.68 |
| 4,212,484 | A * | 7/1980 | Fujii | B60G 17/0152 280/43.23 |
| 10,350,958 | B2 * | 7/2019 | Stolle | B60G 17/0272 |
| 2010/0072760 | A1 * | 3/2010 | Anderson | B60G 13/14 290/1 R |
| 2010/0140884 | A1 * | 6/2010 | Runkel | F16F 9/065 280/5.514 |
| 2019/0100069 | A1 * | 4/2019 | Yoshida | B60G 17/056 |
| 2019/0100070 | A1 * | 4/2019 | Ito | B60G 17/0525 |

(Continued)

FOREIGN PATENT DOCUMENTS

| | | |
|---|---|---|
| DE | 19603593 | 4/1997 |
| DE | 10213156 | 10/2003 |
| DE | 10353025 | 6/2005 |

(Continued)

*Primary Examiner* — Christopher P Schwartz
(74) *Attorney, Agent, or Firm* — COZEN O'CONNOR

(57) ABSTRACT

A hydraulic fluid supply system, in particular for a suspension system, having a pump for supplying a connection of the hydraulic fluid supply system for a connectable actuator. Starting from the pump, a minimum-pressure-maintaining valve having a control connection for the connectable actuator, is operatively provided upstream of the connection.

9 Claims, 2 Drawing Sheets

(56) References Cited

U.S. PATENT DOCUMENTS

2020/0223274 A1* 7/2020 Tucker .................. B60G 11/56

FOREIGN PATENT DOCUMENTS

| DE | 102010054889 | 8/2011 |
| DE | 102011115402 | 4/2012 |
| DE | 102014018788 | 12/2015 |
| DE | 102015209562 | 12/2016 |
| DE | 112015005084 | 8/2017 |
| DE | 102016207628 | 11/2017 |
| DE | 102017216441 | 12/2018 |
| EP | 0076791 | 4/1983 |
| WO | WO 9200203 | 1/1992 |

* cited by examiner

HYDRAULIC FLUID SUPPLY SYSTEM, IN PARTICULAR FOR A SUSPENSION SYSTEM

CROSS REFERENCE TO RELATED APPLICATIONS

This is a U.S. national stage of Application No. PCT/EP2020/083286 filed Nov. 25, 2020. Priority is claimed on German Application No. DE 10 2019 218 699.8 filed Dec. 2, 2019 the content of which is incorporated herein by reference.

BACKGROUND OF THE INVENTION

1. Field of the Invention

The disclosure relates to a pressure medium supply system, in particular for a vehicle level control.

2. Description of Related Art

DE 103 53 025 A1 discloses a pressure medium supply system that comprises a hydraulic pump having two delivery directions. Connected to the pressure medium supply system, as a component of a spring strut, is a hydraulic cylinder. The hydraulic cylinder is configured as a single-acting cylinder. A damping element as a further component of the spring strut forms a self-contained subassembly.

A storage unit as a component of the pressure medium supply system comprises a pressure medium supply, which is permanently under a minimum pressure preload. This ensures that the power consumption of the pump drive can be lower than in an embodiment with an unpressurized reservoir.

DE 102 13 156 A1 discloses a pressure medium supply system by which pressure medium is delivered to a working chamber of a spring strut or from which pressure medium is pumped out. DE 102 13 156 A1 does not explicitly describe whether a hydraulic medium reservoir, to which a reversible pump is connected, is under a minimum pressure preload. It is also not disclosed whether a working chamber on the piston rod side is also filled with hydraulic medium.

DE 10 2017 216 441 B3 describes a spring strut in the form of a vibration damper for level regulation. The pressure medium supply system has a pump that delivers only in one direction. The return of the pressure medium takes place via a return line into a reservoir that is not under a preload. In the embodiment according to FIG. 2 of DE 10 2017 216 441 B3, a casing body filled with gas is used, which preloads the entire pressure medium supply within the spring-loaded accumulator. When such a casing body is used, the pressure in the spring strut must not fall below a minimum pressure since the casing body could be damaged owing to an excessively low counterpressure in the pressure medium supply.

SUMMARY OF THE INVENTION

It is an object of one aspect of the present invention to provide a pressure medium supply system in which a spring strut can be used in conjunction with a gas-filled casing body in combination with a reversible pump without any risk of damage to the casing body.

According to one aspect of the invention, starting from the pump, a minimum-pressure-maintaining valve having a control connection for the connectable control element is arranged functionally upstream of the connection.

One advantage is that the minimum-pressure-maintaining valve enables a connected control element to maintain a minimum load-bearing capacity at all times. Components that are under a residual stress and require a minimum pressure in the control element are thus protected against damage.

In a further advantageous embodiment, the minimum-pressure-maintaining valve has a second control connection to a pump outlet line of the pressure medium supply system. Even when pressure medium is being delivered, a link between the connection and the pressure medium supply is only opened when a sufficient pressure has been built up. This ensures that the minimum-pressure-maintaining valve can be operated completely by passive control.

According to one aspect of the invention, the first and second control connections are functionally connected to one another. This ensures that, for example, in the case of a connection, which is not completely closed and therefore no pressure can be built up in a line section between the connection and the minimum-pressure-maintaining valve, the maximum leakage that occurs is in the volume flow of the control line. In this case, the working volume flow of the pump remains shut off by the minimum-pressure-maintaining valve.

With a view to an optimized use of the power of the pump, the pressure medium reservoir has a pressure preload above atmospheric pressure. As a result, the pump then only has to supply the additional pressure between the instantaneous pressure of the pressure medium reservoir and the pressure level requirement at the connection.

According to one aspect of the invention, the pump has two delivery directions and can therefore be operated with a minimal valve outlay.

A switching valve is arranged functionally between the minimum-pressure-maintaining valve and the pump, wherein a supply line between the switching valve and the pressure medium reservoir extends functionally parallel to the pump outlet line. The running time of the pump can thereby be minimized. The use of energy for the switching valve is negligible in comparison with the use of energy for the pump.

Provision is furthermore advantageously made for an intake line of the pump and the supply line to be separated from one another. In this way, a hydraulic short circuit within the pressure medium supply system is simply prevented.

A further advantage of using the switching valve is that, when pressure medium is delivered from the pressure medium reservoir via the pump outlet line, the switching valve shuts off the supply line. There is thus a clear separation of the pressure medium supply for the connection.

This can also involve the pump outlet line being shut off when a link is established between the connection and the pressure medium reservoir via the supply line by the switching valve.

The connection is preferably connected to a control element having a reservoir, which is separate from the pressure medium reservoir and has a casing body with an enclosed gas mass for the pressure preload.

BRIEF DESCRIPTION OF THE DRAWINGS

The invention will be explained in greater detail with reference to the following description of the figures, of which.

DETAILED DESCRIPTION OF THE PRESENTLY PREFERRED EMBODIMENTS

Figure 1:
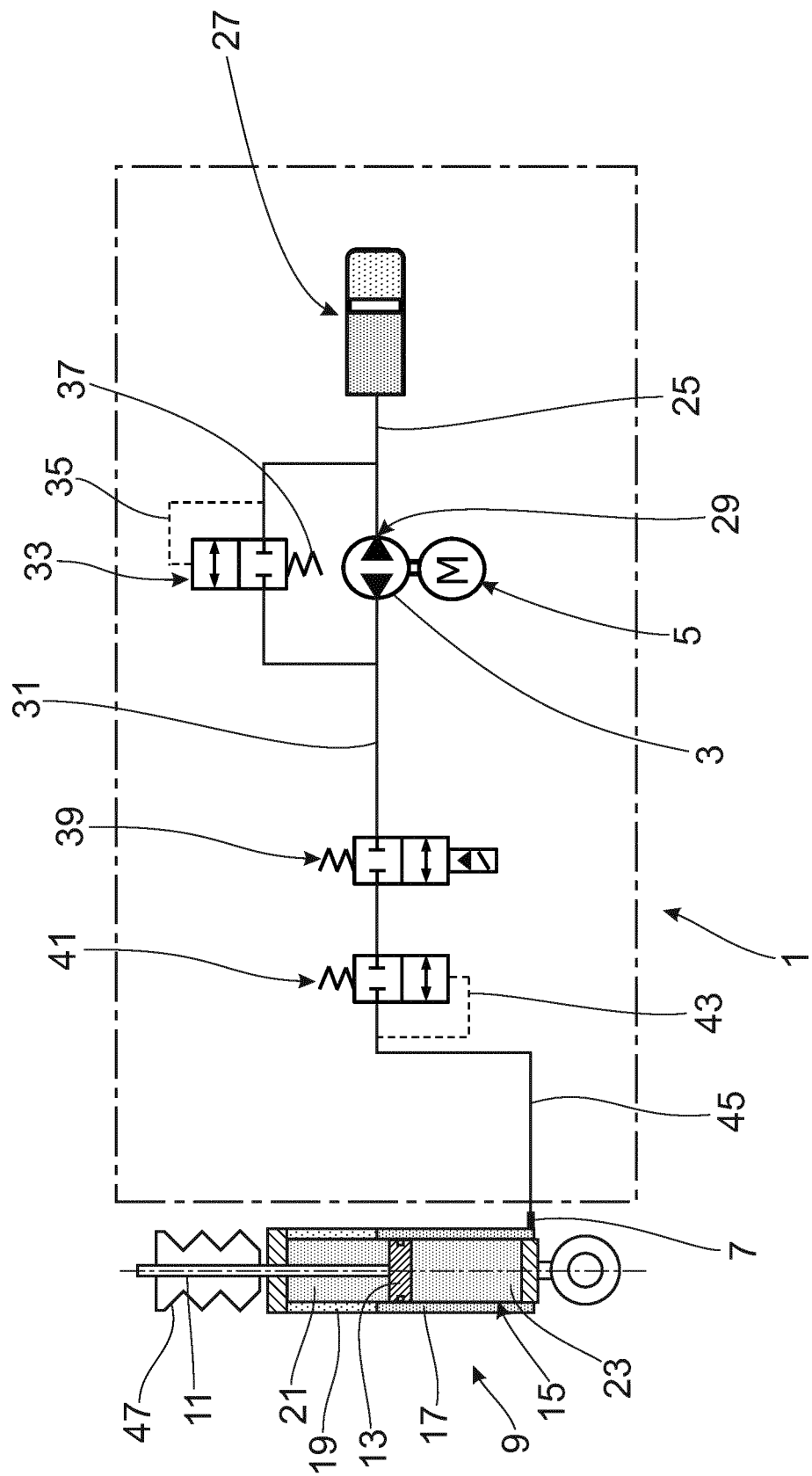
FIG. 1 shows an equivalent diagram of a pressure medium supply system.

FIG. 1 shows an equivalent diagram of a pressure medium supply system 1, in particular for a suspension system. A pressure medium supply system of this type can be used, for example, for level regulation in a passenger car, a commercial vehicle, or even a two-wheeled vehicle. Use in cab mounting of a commercial vehicle or a machine is also conceivable.

The pressure medium supply system 1 comprises a pump 3 having a pump drive 5 for supplying a connection 7. This connection 7 is connected to a control element 9, e.g. a spring strut. The control element 9 illustrated is preferably a vibration damper with a piston rod 11 and a piston 13, which are guided in an axially movable manner in a cylinder 15. To compensate for the damping medium displaced by the piston rod 11 within the cylinder 15, the control element 9 has a compensating space 17, in which a pressurized gas mass is arranged in a casing body 19. A casing body of this kind is known from DE 10 2015 209 562 A1 or from DE 10 2016 207 628 A1, for example. During an extension movement of the piston rod 3 out of the cylinder, the volume of the casing body 19 increases owing to the effect of the internal gas pressure, with the result that a working chamber 21 on the piston rod side and a working chamber 23 remote from the piston rod are always filled with a pressure medium. The pressure level inside the casing body 19 and the pressure level of the pressure medium in the compensating space 17 are identical, and therefore the casing body has virtually no significant load.

The pump 3 is connected via an intake line 25 to a pressure medium reservoir 27, which has a pressure preload above atmospheric pressure. The pressure preload inside the pressure medium reservoir 27 depends on the load on the control element 9. An appropriate pressure preload could be based on the fact that the control element 9 holds a defined load at a defined level and, at the same time, the pressure level in the pressure medium reservoir 27 corresponds to the pressure medium level in the control element 9.

The pump 3 has two delivery directions, and therefore an actuating movement of the control element 9 in both adjustment directions is possible solely through control of the pump 3.

A pressure relief valve 33, which has a connection between a control line 35 and the intake line 25, is arranged between the intake line 25, which is situated between the pressure medium reservoir 27 and an intake connection 29 of the pump 3 and a pump outlet line 31. The pressure relief valve 33 assumes a shutoff position due to a spring preload 37 and, when required, is transferred to a passage position by the pressure in the control line 35. This prevents the pressure level in the pressure medium reservoir 27 from exceeding an upper limit value owing to incorrect control of the pump 3.

Between the connection 7 and the pump 3, it is possible to arrange a switching valve 39, by which the supply of pressure medium, but also the return flow from the connection 7 in the direction of the pressure medium reservoir 27, is controlled. In the simplest embodiment, a simple 2/2-way valve is sufficient, which has only one passage position and one blocking position. In principle, the switching valve 39 could be dispensed with, but then the pump 3 should have only an internal minimal leakage in both directions of flow from the connection 7 to the pressure medium reservoir 27 and vice versa. By the switching valve 39, the possible influence of internal leakage is eliminated.

Furthermore, starting from the pump 3, a minimum-pressure-maintaining valve 41 having a control connection 43 for the connectable control element 9 is arranged functionally upstream of the connection 7. The control connection 43 is connected to a connection line 45, which inter alia extends between the connection 7 and the minimum-pressure-maintaining valve 41 and as far as the switching valve 39. In the starting position of the minimum-pressure-maintaining valve 41, an actuating force ensures the assumption of a blocking position of the valve. Only when a sufficiently high pressure is built up in the connection line 45 and thus in the control connection 43, e.g. by the instantaneous pressure of the control element 9 at the connection 7, is a pressure force built up counter to the actuating force, which pressure force moves the minimum-pressure-maintaining valve 41 into the passage position. The minimum-pressure-maintaining valve 41 preferably has only these two switching positions.

During operation of the pressure medium supply system 1, pressure medium is pumped around as required between the control element 9 and the pressure medium reservoir 27. By virtue of the two delivery directions of the pump 3, it is also possible for a retraction movement of the piston rod 11 to be assisted by the pump 3 on the basis of a load acting on the control element 9, in addition to the displacement capacity. However, it is possible for the case to occur that the retraction movement of the piston rod 11 into the cylinder 15 is blocked mechanically, for example. FIG. 1 illustrates this case by way of example in that an outer stop spring 47 reaches its compressed length. The pump 3 could also draw pressure medium from the control element 9. The working chamber 23 remote from the piston rod and the compensating space 17 in the control element 9 are hydraulically connected to one another. There is a risk that the pressure in the compensating space 17 will reach an excessively low pressure level in relation to the prefilled pressure level of the gas mass enclosed in the casing body 19. In this case, the casing body 19 would be subject to high mechanical stress.

The minimum-pressure-maintaining valve 41 prevents this state by moving to the blocking position when the pressure drops below a limit pressure within the control connection 43.

Figure 2:
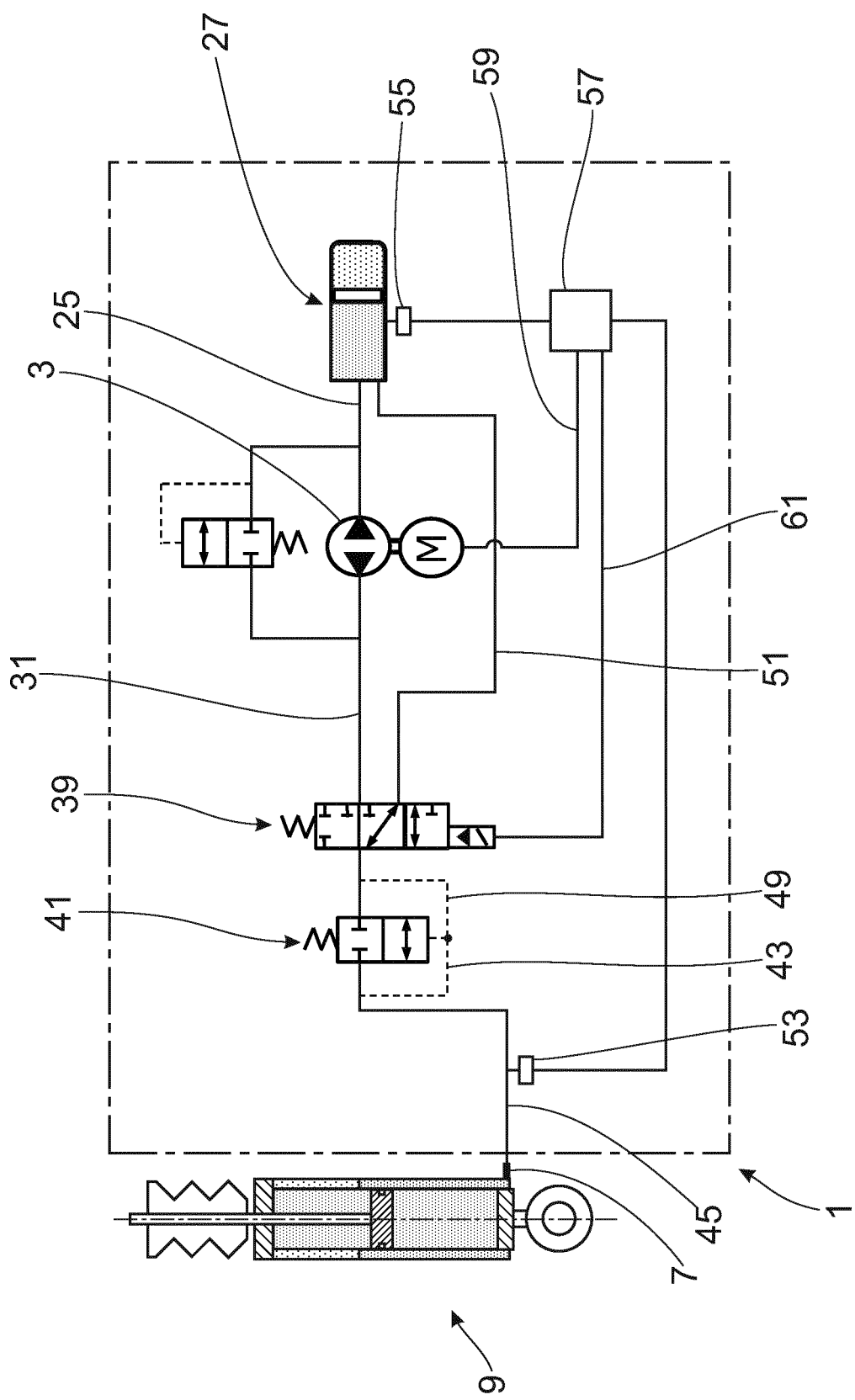
FIG. 2 shows an extended pressure medium supply system based on FIG. 1.

Based on the pressure medium supply system according to FIG. 1, the minimum-pressure-maintaining valve 41 according to FIG. 2 has a second control connection 49 to the pump outlet line 31 of the pressure medium supply system 1. In addition, the first and second control connections 43; 49 are functionally connected to one another. This combined construction principle is by no means mandatory. This ensures that, when the minimum-pressure-maintaining valve 41 moves into the blocking position as a result of a minimum pressure limit within the control connection 43, it can be brought back into the passage position when pressure medium is delivered, starting from the pressure medium reservoir 27 or the pump 3, without burdening the control element 9 with an additional mass, for example. On the other hand, it is only possible for a sufficient pressure level to build up within the two connected control connections 43; 49 if the connection 7 is also connected as intended to a control element or some other unit with an appropriate backpressure.

In contrast to the configuration according to FIG. 1, the switching valve 39 is expanded in its functionality and the connections. The switching valve 39 according to FIG. 2 is a 3/3-way valve, which is likewise arranged functionally between the minimum-pressure-maintaining valve 41 and the pump 3, although a supply line 51 between the switching valve 39 and the pressure medium reservoir 27 extends functionally parallel to the pump outlet line 31. Thus, depending on the pressure levels in the control element 9 and in the pressure medium reservoir 27, adjusting movements of the control element 9 are possible without active pumping work solely on the basis of exploiting the instantaneous pressure drop between the control element 9 and the pressure medium reservoir 27.

For this purpose, the pressure level in the connection line 45 and in the pressure medium reservoir 27, e.g. in the intake line 25, is optionally detected by means of sensors 53; 55 and fed to a computer unit 57. Control lines 59; 61 connect the computer unit 57 to the pump 3 and the switching valve 39.

The intake line 25 of the pump 3 and the supply line 51 are also separated from one another. As a result, the pressure medium can be supplied from the pressure medium reservoir 27 to the switching valve 39 entirely in parallel with the pump 3.

In a first switching position, which represents the initial position of the switching valve 39, the pump outlet line 31, the supply line 51 and the connection line 45 between the switching valve 39 and the minimum-pressure-maintaining valve 41 are blocked.

In a second switching position of the switching valve 39, there is a supply line 51 available through which flow can pass independently of the direction. The pump outlet line 31 is blocked.

In a third switching position of the switching valve 39, the supply line 51 is shut off while pressure medium is delivered from the pressure medium reservoir 27 via the pump outlet line 31.

Thus, it is always possible to establish a strict separation of the pressure medium supply of the control element 9 either via the pump 3 or directly via the supply line 51.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pressure medium supply system for a suspension system, comprising:
   a pump configured to supply a connection of the pressure medium supply system for a connectable control element;
   a minimum-pressure-maintaining valve arranged functionally upstream of the connection and having a control connection for the connectable control element;
   a pressure medium reservoir,
   wherein the pressure medium reservoir has a pressure preload above atmospheric pressure; and
   a switching valve arranged functionally between the minimum-pressure-maintaining valve and the pump,
   wherein a supply line between the switching valve and the pressure medium reservoir extends functionally parallel to a pump outlet line.

2. The pressure medium supply system as claimed in claim 1, wherein the minimum-pressure-maintaining valve has a second control connection to a pump outlet line of the pump.

3. The pressure medium supply system as claimed in claim 2, wherein the first and second control connections are functionally connected to one another.

4. The pressure medium supply system as claimed in claim 1, wherein the pump has two delivery directions.

5. The pressure medium supply system as claimed in claim 1, wherein an intake line of the pump and the supply line are separate from one another.

6. The pressure medium supply system as claimed in claim 1, wherein, when pressure medium is delivered from the pressure medium reservoir via the pump outlet line, the switching valve shuts off the supply line.

7. The pressure medium supply system as claimed in claim 1, wherein the pump outlet line is shut off when a link is established between the connection and the pressure medium reservoir via the supply line by the switching valve.

8. The pressure medium supply system as claimed in claim 1, wherein the connection is connected to a control element comprising:
   a reservoir, which is separate from the pressure medium reservoir; and
   a casing body with an enclosed gas mass for the pressure preload.

9. The pressure medium supply system as claimed in claim 1, wherein the minimum-pressure-maintaining valve is arranged functionally downstream from the pump.

* * * * *